Figure 1:
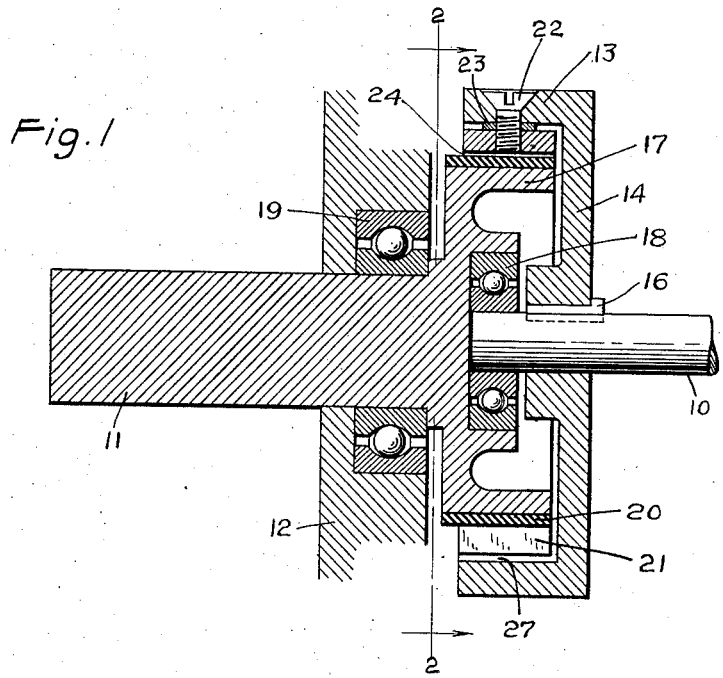

J. A. VOLK, Jr.
AUTOMATIC SPEED REGULATING CLUTCH.
APPLICATION FILED OCT. 11, 1911.

1,044,307.

Patented Nov. 12, 1912.

2 SHEETS—SHEET 1.

J. A. VOLK, Jr.
AUTOMATIC SPEED REGULATING CLUTCH.
APPLICATION FILED OCT. 11, 1911.

1,044,307.

Patented Nov. 12, 1912.
2 SHEETS—SHEET 2.

WITNESSES:
H. W. Meade
S. W. Atherton

INVENTOR
Joseph A. Volk Jr.
BY
A. M. Wooster
ATTORNEY

UNITED STATES PATENT OFFICE.

JOSEPH A. VOLK, JR., OF SOUTH NORWALK, CONNECTICUT.

AUTOMATIC SPEED-REGULATING CLUTCH.

1,044,307.

Specification of Letters Patent.

Patented Nov. 12, 1912.

Application filed October 11, 1911. Serial No. 654,141.

*To all whom it may concern:*

Be it known that I, JOSEPH A. VOLK, Jr., a citizen of the United States, residing at South Norwalk, county of Fairfield, State of Connecticut, have invented an Improvement in Automatic Speed-Regulating Clutches, of which the following is a specification.

This invention has for its object to provide an automatic speed regulating clutch adapted for general use and especially adapted for use between a driving shaft whose speed may be variable and a driven shaft whose speed should not go above a predetermined maximum, as between the shaft of an engine or water wheel and a dynamo; for example, in a lighting system where increase of speed of the dynamo armature would increase voltage and might cause the burning out of lamps and do serious damage, or in factories where the speed of a driving shaft will increase as work is removed therefrom.

With the general object in view of controlling a driven shaft I have devised the novel automatic clutch which I will now describe, referring to the accompanying drawings forming a part of this specification and using reference characters to indicate the several parts.

Figure 2:
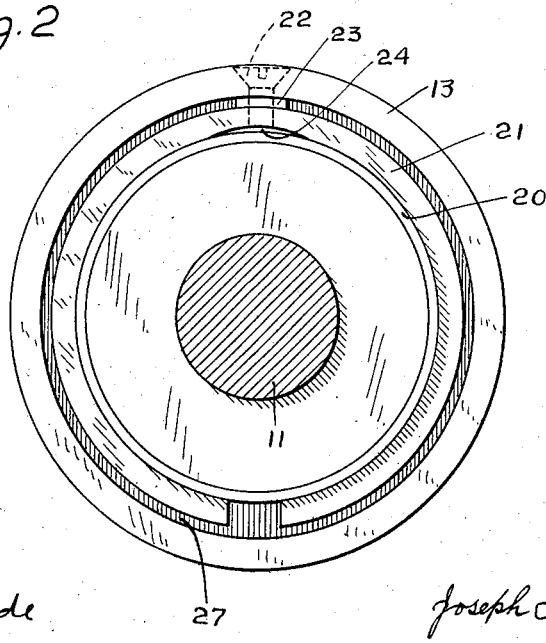
Figure 3:
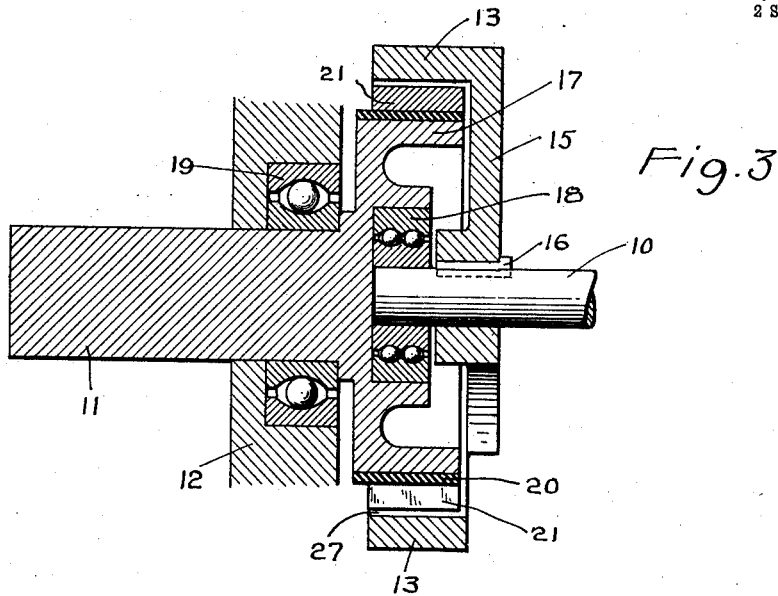
Figure 4:
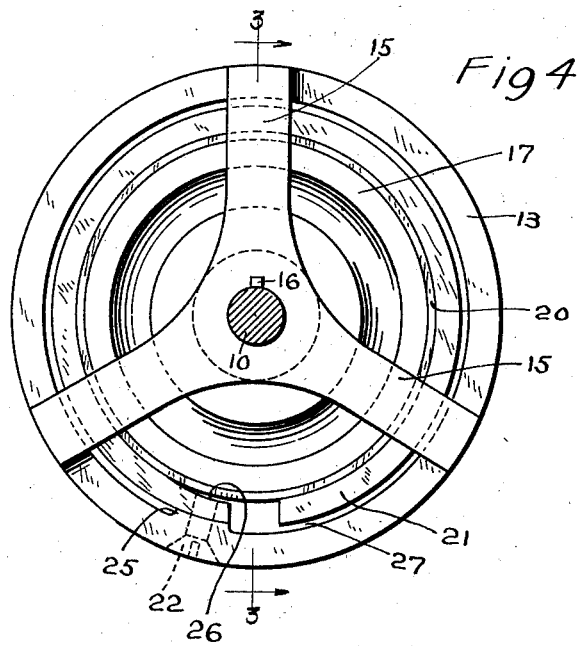

Figure 1 is a longitudinal section of my novel clutch; Fig. 2 a section on the line 2—2 in Fig. 1, looking in the direction of the arrows; Fig. 3 a section corresponding with Fig. 1, illustrating a variant form of construction, the section line being indicated by 3—3 in Fig. 4, looking in the direction of the arrows; and Fig. 4 is an elevation as seen from the right in Fig. 3.

10 denotes a driving shaft and 11 a driven shaft shown as journaled in framework, indicated by 12. The driving shaft carries a driving ring 13 which may be supported either by a disk 14, as in Figs. 1 and 2, or a spider 15, as in Figs. 3 and 4, the disk or spider being rigidly secured to the shaft as by a key 16. Driven shaft 11 is carried by driven disk 17 which lies within the driving ring and is provided in its face with a recess to receive the members of a ball bearing, indicated as a whole by 18, one member of the bearing being rigidly secured to the disk, the other to the driving shaft as by a drive fit. Another ball bearing, indicated as a whole by 19, is interposed between the driven shaft and the framework. The periphery of the driven disk is provided with a friction ring of any suitable material, indicated by 20.

The essential principle of the invention is the interposition between the driving ring and the driven disk of a spring ring 21 carried by the driving ring which lies in a circular recess 27 between the driving ring and the driven disk and normally grips the driven disk with sufficient power to cause the driving shaft to carry the driven shaft. The tension or gripping power of the spring ring is such that when the speed of the driven shaft rises above a predetermined maximum, centrifugal force will cause said ring to loosen its grip upon the driven disk and will prevent the speed of the driven disk and driven shaft from rising above the predetermined maximum, no matter how much higher the speed of the driving shaft may rise. The gripping power of the spring ring may be regulated and determined either by varying the mass of the ring or by systematically weakening the ring.

In Figs. 1 and 2, I have shown the spring ring as secured to the driving ring by means of a screw 22 which passes through the driving ring and through a spacing washer 23 and engages the spring ring at its mid length. I have also in these views shown the tension of the spring ring as regulated and determined by removing metal from the mid length of said ring, as indicated at 24.

In Figs. 3 and 4, I have illustrated a form in which the spring ring is secured to the driving ring by means of a screw passing through a boss 25 on the inner periphery of the driving ring and engaging the spring ring near one end, the engaged end of the spring ring being weakened by the removal of metal, as at 26. It should be understood, however, that this adjustment of the tension or gripping power of the spring ring may be determined by varying the mass of the ring just as well as by the removal of metal from either the mid-length or the attached end of the ring, and that it is wholly immaterial, so far as the principle of the invention is concerned, whether the spring ring is attached to the driving ring at its mid length leaving the ends of the spring ring operative and its mid length inoperative or the spring ring is attached at one end leaving practically the entire ring operative.

The spring ring is easily removed from a clutch and another one put in its place. In making the spring rings they are regulated and adjusted to permit a certain maximum of speed as, for example, fifteen hundred revolutions per minute, and I find in practice that it is quite practicable to adjust the rings so accurately that the variation in speed in use will not exceed two per cent. above the predetermined maximum. Until the predetermined maximum speed of the driven shaft is reached by the driving shaft, the tension of the spring ring will cause the driven shaft to be carried at the full speed of the driving shaft. Should the speed of the driving shaft however rise appreciably above this predetermined maximum for the driven shaft, centrifugal force will cause the spring ring to yield sufficiently so that there will be slippage between the spring ring and the driven disk, but said disk and the driven shaft will rotate smoothly and evenly at the maximum speed without being affected to any appreciable extent by increase of speed of the driving shaft.

Having thus described my invention I claim:

A speed regulating clutch comprising a driving shell, a driven shell, a resilient clutch ring carried by the driving shell for engaging the driven shell and being reduced by the removal of metal therefrom to regulate its tension, and means for detachably fastening the clutch ring to the driving ring.

In testimony whereof I affix my signature in presence of two witnesses.

JOSEPH A. VOLK, Jr.

Witnesses:
EDWARD B. SMITH,
FRANK T. BRUNDAGE.

---

Copies of this patent may be obtained for five cents each, by addressing the "Commissioner of Patents, Washington, D. C."